(12) United States Patent
Gomes De Oliveira et al.

(10) Patent No.: US 9,517,957 B2
(45) Date of Patent: Dec. 13, 2016

(54) FACILITY FOR REMOVAL OF MATERIALS AND/OR POLLUTING SUBSTANCES CONTAINED IN WATERCOURSES

(71) Applicants: Joao Carlos Gomes De Oliveira, Sao Paulo (BR); Procopio Gomes De Oliveira Netto, Sao Paulo (BR); Felipe Gomes De Oliveira, Sao Paulo (BR)

(72) Inventors: Joao Carlos Gomes De Oliveira, Sao Paulo (BR); Procopio Gomes De Oliveira Netto, Sao Paulo (BR); Felipe Gomes De Oliveira, Sao Paulo (BR)

(*) Notice: Subject to any disclaimer, the term of this patent is extended or adjusted under 35 U.S.C. 154(b) by 184 days.

(21) Appl. No.: 14/360,557

(22) PCT Filed: Nov. 21, 2012

(86) PCT No.: PCT/BR2012/000464
§ 371 (c)(1),
(2) Date: May 23, 2014

(87) PCT Pub. No.: WO2013/075194
PCT Pub. Date: May 30, 2013

(65) Prior Publication Data
US 2014/0326648 A1   Nov. 6, 2014

(30) Foreign Application Priority Data

Nov. 23, 2011   (BR) ..................... 1105005

(51) Int. Cl.
*C02F 9/00* (2006.01)
*C02F 1/24* (2006.01)
(Continued)

(52) U.S. Cl.
CPC .............. *C02F 9/00* (2013.01); *B01F 5/0456* (2013.01); *B01F 13/0255* (2013.01);
(Continued)

(58) Field of Classification Search
CPC ............ E02B 1/003; E02B 3/02; E02B 3/023; E02B 5/08; E02B 5/085; E02B 8/02; E02B 8/023; C02F 1/24; C02F 1/5281; C02F 7/00; C02F 2103/007; B03D 1/145; B03D 1/1462
(Continued)

(56) References Cited

U.S. PATENT DOCUMENTS 3,470,091 A * 9/1969 Budd .................. C02F 7/00
                                              210/170.1
4,176,058 A * 11/1979 Grobler .................. C02F 1/24
                                              210/747.5
(Continued)

FOREIGN PATENT DOCUMENTS

BR    9702430 A   3/1999
BR    0105462 A   4/2003
(Continued)

OTHER PUBLICATIONS

International Search Report, Brazilian International Application No. PCT/BR2012/000464.

*Primary Examiner* — Christopher Upton
(74) *Attorney, Agent, or Firm* — Arent Fox LLP

(57) ABSTRACT

"IMPROVEMENT ON FACILITY FOR REMOVAL OF MATERIALS AND/OR POLLUTING SUBSTANCES CONTAINED IN WATERCOURSES", applied to facility comprising: the implementation of a sandbox arranged at the bottom and in a stretch of the watercourse, followed by a floating garbage fence arranged substantially transversely to the watercourse; whereas downstream and at a certain distance from this garbage fence is provided a suspended and transverse metallic structure to the watercourse, in which curtains for selective injection and automatically set in motion are mounted, arranged spaced and interspersed by homogenization diffusers, these curtains are responsible for (Continued)

the injection of coagulants; by the injection of polymers into the watercourse to be treated, and ahead there is a phase for release of microbubbles of air, causing a flotation of these aggregate particles; allowing that from this flotation stretch arises, along the watercourse, a superficial agglomeration of the floated material, and the conduction by flexible and longitudinal barriers formed by synthetic membranes of this floated material to a transverse alignment of dredging modules, that extend through the entire watercourse's width promoting the concentration of floated material and its removal. This improvement consisting of all equipment (3, 4, 7) originally installed transversally the watercourse, which are subject to partial or total removal from this transverse condition, allowing the clearance of part and/or entire bed of the watercourse.

12 Claims, 4 Drawing Sheets

(51) Int. Cl.
| | |
|---|---|
| *C02F 1/52* | (2006.01) |
| *C02F 1/56* | (2006.01) |
| *B01F 5/04* | (2006.01) |
| *B01F 13/02* | (2006.01) |
| *B03D 1/14* | (2006.01) |
| *B03D 1/24* | (2006.01) |
| *E02B 1/00* | (2006.01) |
| *E02B 3/02* | (2006.01) |
| *E02B 5/08* | (2006.01) |
| *E02B 8/02* | (2006.01) |
| *C02F 1/00* | (2006.01) |
| *C02F 103/00* | (2006.01) |
| *C02F 7/00* | (2006.01) |

(52) U.S. Cl.
CPC .............. *B03D 1/1462* (2013.01); *B03D 1/24* (2013.01); *C02F 1/24* (2013.01); *C02F 1/52* (2013.01); *C02F 1/5281* (2013.01); *C02F 1/56* (2013.01); *E02B 1/003* (2013.01); *E02B 3/02* (2013.01); *E02B 3/023* (2013.01); *E02B 5/085* (2013.01); *E02B 8/023* (2013.01); *C02F 1/006* (2013.01); *C02F 7/00* (2013.01); *C02F 2103/001* (2013.01); *C02F 2103/007* (2013.01); *Y02W 10/15* (2015.05)

(58) Field of Classification Search
USPC .................................. 210/162, 170.1, 747.5
See application file for complete search history.

(56) References Cited

U.S. PATENT DOCUMENTS

| | | | |
|---|---|---|---|
| 4,360,427 A * | 11/1982 | Posgate | C02F 1/5281 210/170.1 |
| 6,802,978 B2 * | 10/2004 | Gomes de Oliveira | C02F 1/24 210/170.03 |
| 7,297,258 B2 * | 11/2007 | Gomes De Oliveira | C02F 9/00 210/170.1 |
| 2009/0277822 A1 * | 11/2009 | Gomes De Oliveira | C02F 3/30 210/202 |
| 2013/0140242 A1 * | 6/2013 | Gomes De Oliveira | C02F 1/24 210/704 |

FOREIGN PATENT DOCUMENTS

| | | |
|---|---|---|
| BR | 0306256 A | 8/2005 |
| WO | WO 2011/127547 A1 | 10/2011 |

* cited by examiner

A-A

FACILITY FOR REMOVAL OF MATERIALS AND/OR POLLUTING SUBSTANCES CONTAINED IN WATERCOURSES

CROSS-REFERENCE TO RELATED APPLICATION

This application is a National Stage entry of International Application PCT/BR2012/000464 filed Nov. 21, 2012, which claims priority to Brazilian Patent Application No. PI1105005-5 filed Nov. 23, 2011, the disclosures of each of these prior applications being hereby incorporated in their entirety by reference.

This report refers to an improvement on facility for removal of materials and/or polluting substances in polluted watercourses and, more particularly, to an improvement in this type of system which allows a partial and/or total mobility of equipment in relation to the watercourse, that is compatible with flow rates and varying levels of the latter and without interfering with the peculiar occurrences of a watercourse.

More specifically, this improved facility aims to perform, more dynamically and with a greater level of compatibility with different types of existing watercourses, the process of removal of materials and/or polluting substances contained in watercourses, object of the patent PI9702430-9 from Nov. 7, 1997 filed by the same holder.

As it is known and mentioned in the patent PI9702430-9, the pollution of watercourses and the deterioration of the environment existing in urban centers is a phenomenon of modern civilization. Formation, development and demographic growth create and exacerbate health problems which in small urban centers could be solved more easily and with much lower costs through the implementation of individual systems, or even small collective systems.

However, the solutions provided for individual systems are not possible to be performed on large demographic centers, because the availability of areas in urban lots and the capacity of sanitary landfill are not sufficient for the liquid and solid waste generated.

The sanitary disposal of such wastes and wastewaters directly discharged, in excessive volume, in watercourses does not allow the occurrence of the phenomenon called self-purification, which makes rivers, lakes and reservoirs of large urban centers in open sewers.

High investments in a public sewer system is necessary to allow an efficient reversal of this process of environmental deterioration, to enable the rapid and safe removal of wastewater, of waste and liquid waste from human activities, as well as to carry out the treatment of the material removed.

Actually, in developing countries, the resources needed to implement an effective sanitation system are not enough, because of the rapid growth of urban centers.

In order to ensure, economically and dynamically, the improvement of sanitary conditions of the populations affected by these problems, the implementation of a system for removing the pollution from domestic and/or industrial sewage existing in the watercourse itself was proposed, which allows: a) the elimination of offensive aspects in the aesthetic sense, as well as the disappearance of odors; b) the use of water resources for future reuse; c) the use of urban watercourses as elements for recreation and sports; d) the conservation of natural water resources against excessive pollution and its maintenance for comprehensive use.

This system proposed does not meet the needs for collection and transportation of wastewater, but it allows, in regions where there is not an efficient sewage system, that waste discharged into watercourses are retained and removed, preventing their deterioration over the watercourse and hence the deterioration of the watercourse itself.

Thus, in December 2003, the holder herein proposed a facility for removal of materials and/or polluting substances in watercourses, comprising the sequential implementation of: a line of air diffusers arranged in the bottom and across the watercourse, promoting aeration and stirring of the watercourse and flotation of thick material that is collected downwatercourse by a floating fence, the garbage fence, which is set substantially across the watercourse, where thick materials are removed from the watercourse; whereas downwatercourse and at a certain distance from this garbage fence is provided a suspended and transverse metallic structure to the water course in which are mounted at least three curtains for selective injection and that are set in motion automatically disposed spaced one from another and interspersed by homogenization diffusers, where the first curtain is responsible for injection of coagulants; the second curtain is responsible for injection of polymers in the watercourse to be treated, allowing a stretch of flocculation in this watercourse, so that downwatercourse will occur an aggregation of particles in suspension, defining larger flakes; this stretch of flocculation being subject to the third curtain of injection responsible for microaeration, where these aggregate and larger particles are subject to at least one stage of supersaturated dissolution of water/air, which depressurized releases micro air bubbles, causing a flotation of these aggregated particles; allowing therefore a stretch of flotation along the watercourse, so that downwatercourse will occur a surface agglomeration of the floated material and transport of it by flexible and longitudinal barriers, formed by synthetic membranes, for a dredging transverse alignment, composed by a plurality of dredging modules that extend across the whole watercourse's width, promoting the concentration of that floated material and its removal for a capture container, which allows that this material removed from the watercourse is pumped to a restricted and distant area from the watercourse, where it is temporarily stored for subsequent dehydration and recycling as byproduct, depending on its composition.

Although this facility provides a very satisfactory and efficient removal of polluting materials and/or substances contained into polluted watercourses, it presents as a limiting aspect its constructiveness condition, that is virtually static compared to the watercourse, that leads to a construction and assembly virtually dedicated to each type of watercourse chosen for treatment, and it does not yet give the possibility of partial and/or total mobility of equipment in relation to the watercourse, for instance, if the passage of a vessel or even the replacement of any equipment installed on the watercourse are necessary, a situation which currently obliges the maintenance personnel to stand over the watercourse to performance the maintenance of equipment.

One objective of this invention is to provide an IMPROVEMENT ON FACILITY for removal of materials and/or polluting substances contained in watercourses, which does not require the execution of works for defining a tankage for treatment of polluted water from a watercourse, and which allows the adequacy of flotation process to the variation of flow, concentration of polluting substances and water level of the watercourse treated.

Another objective of this invention is to provide an improvement on facility for removal of materials and/or polluting substances contained in watercourses which can adapt to any kind of watercourse, allowing full and/or partial mobility of equipment in relation to the watercourse treated.

Another objective of this invention is to provide an IMPROVEMENT ON FACILITY for removal of materials and/or polluting substances contained in watercourses, whose implementation is quick and easy, requiring little adaptation in the stretch of the watercourse in which its installation will be performed.

Another objective of this invention is to provide an IMPROVEMENT ON FACILITY for removal of materials and/or polluting substances contained in watercourses, allowing easier and faster preventive or corrective maintenance, and without submitting the maintenance team to operational risks.

These and other objectives and advantages of the present invention are achieved with an IMPROVEMENT ON FACILITY for removal of materials and/or polluting substances contained in watercourses, comprising the sequential implementation of: a sandbox arranged at the bottom and in a stretch of the watercourse, followed by a garbage floating fence, arranged substantially across the watercourse, where the thick materials coming from the watercourse are removed from this stretch of the watercourse; downwatercourse and at a certain distance from a this garbage fence is provided a suspended and cross metallic structure, in which are mounted at least three curtains for selective injection and which are set in motion automatically, arranged spaced among them and interspersed with homogenization diffusers, where the first curtain is responsible for the injection of coagulants; the second curtain is responsible for injecting the polymers in the watercourse to be treated, allowing a stretch of coagulation in this watercourse, so that downwatercourse an aggregation of particles in suspension will occur, defining larger flakes in the stretch of flocculation; this stretch of flocculation being subject to the third curtain of injection responsible by microaeration, where these aggregate and larger particles are subject to at least one step for release of microbubbles of air, causing a flotation of these aggregated particles; allowing that from this stretch of the watercourse a superficial agglomeration of the floated material occur and the conduction, by longitudinal and flexible barriers, formed by synthetic membranes, of that floated material for a dredging longitudinal alignment, comprising a plurality of dredging modules, extending through the bank or banks of watercourses, promoting the concentration of floated material and its removal for a capture container, which allows the material to be removed from the watercourse and pumped to a restricted and distant area from the watercourse, where it is temporarily stored for subsequent dehydration and recycling as a byproduct, depending on its composition. According to the present invention, the improvement in question is based on the fact that all the equipment originally installed on the suspended and transverse metallic structure on the watercourse are subject to partial or complete removal from this transverse condition, enabling the clearance of a part of and/or entire watercourse bed, as needed.

In a more particular way, the IMPROVEMENT ON FACILITY for removal of materials and/or polluting substances contained in watercourses is based on the provision of mechanical arms for supporting equipment that define the facility and its action phases, and these mechanical aims are pivoted and/or rotative along the watercourse banks, to allow its angular displacement, in both the vertical and in the horizontal level; supporting with itself, during this displacement, the equipment which form the facility and which are fixed or supported, ensuring partial and/or total clearance of the watercourse, whether for maintenance of equipment or to allow the passage of a vessel into the watercourse.

Below this invention will be described with reference to the accompanying drawings, as examples and without limiting character, in which.

Figure 5:
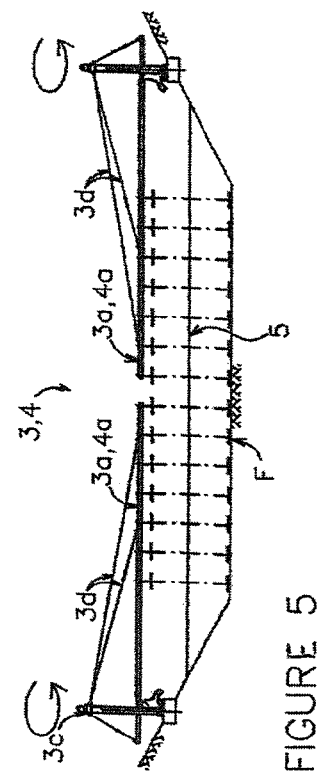
Figure 4:
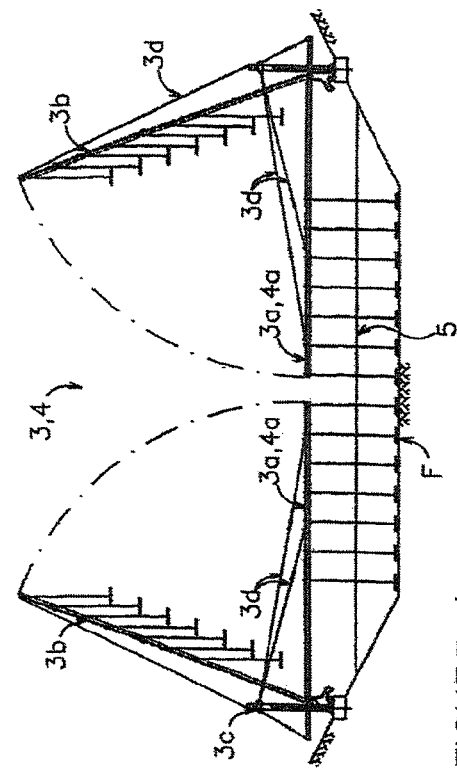

FIGS. 4 and 5 show two schematic views of a cross section A-A of the metallic structure suspended, which composes the facility for aeration and microaeration, which is illustrated in FIG. 4, the pivoting structure on its two limit positions in relation to the watercourse bed, operating and non-operating, and in FIG. 5, the rotative structure on its two limit positions in relation to the watercourse bed, operating and non-operating.

According to these figures, the improvement in the facility for removal of material and/or polluting substances in watercourses, object of the present invention, is applied to a type of facility comprising: one sandbox arranged in the bottom of a stretch of the watercourse, with a substantial and transverse floating garbage fence 2, accompanying variations in the watercourse flow, this fence 2 arranged substantially and transversely to the watercourse, where those thick floating materials from the watercourse are retained and removed in this stretch of watercourse. Downwatercourse and at a certain distance from this garbage fence 2 is provided a metallic structure with mechanical arms 3 and 4 suspended and transverse to the watercourse, in which are mounted at least three curtains for selective injection and that are automatically set in motion, arranged spaced one from another and interspersed with homogenization diffusers. These curtains, for example, may be sequentially responsible for injecting coagulants; for injecting polymers in the watercourse, allowing a stretch of flocculation in this watercourse, so that downwatercourse an aggregation of particles in suspension will occur, defining larger flakes; and by the injection of air particles generating a microaeration, where these larger and aggregated particles are subject to at least one phase of release of micro-bubbles, causing a flotation of such aggregated particles; allowing therefore that from this flotation stretch arises, along the watercourse, a surficial agglomeration of the floated material and the condution, by longitudinal and flexible barriers 10, formed by synthetic membranes, of this floated material for a transverse alignment of a dredging structure 7, comprising a plurality of dredging wheels 7a, promoting the collection of this floated sludge (LF) and its removal for a capture container, which allows that the material removed from the watercourse is pumped into a restricted and distant area from the watercourse, where it is temporarily stored for subsequent dehydration and recycling as a byproduct, depending on its composition.

According to the present invention, the improvement mentioned is based on the fact that all equipment 3, 4 and 7 originally installed across the watercourse are subject to partial or total removal from this cross condition, allowing the clearance of a part of and/or the whole watercourse bed, as illustrated in the figures.

At the facility proposed here, the floating fence 2 does not require its removal to adjust the flow of the watercourse, because it, for being floating, accompanies the level of the watercourse bed.

At watercourse downwatercourse, the improved facility is provided with a metallic structure with suspended pivoting and/or rotative mechanical aims 3 and 4, large-sized, formed by a plurality of elevated beams 3a and 4a mounted in an articulated manner in vertical columns 3c, defined by winches which through the corresponding tensioner cables 3d support and angularly direct those beams 3a and 4a. Thus, this suspended structure 3 and 4, as shown in the figures, has each elevated beam 3a and 4a supported by respective vertical columns 3c, by means of tensioner cables 3d which keep the referred elevated beam 3a and 4a parallel to the surface of the watercourse, in operating condition and raised almost vertically or horizontally flipped to the surface of the watercourse, along the bank of this watercourse, for not preventing the passage of vessels with appropriate size according to the navigability of the watercourse, as seen in FIGS. 4 and 5 respectively.

Each beam 3a and 4a is mounted, a corresponding curtain for injection 5 formed by a set of injection pumps, relief valves and extendable hoses, not shown, which are selectively displaced down until its lower end or the output reaches the bottom F of the watercourse, see FIG. 4, in order to allow that each curtain 5 acts as a transverse line for selective injection and automatically set in motion, these curtains 5 arranged spaced one from another and interspersed by sets of homogenization diffusers 11 extending selectively until the bottom F of the watercourse. The vertical lifting and lowering of each line for injection that composes the curtain 5 is defined by a manual or automatic reel that through winches and steel cables lift selectively up and down this line of curtain for injection 5.

Thus, the suspended structure 3 and 4 can be formed by different rows, according to the need of the watercourse treatment, once it is selective and removable, this suspended structure 3 and 4 may be defined by: curtain for injection of coagulants; curtain for injection of polymers; curtain for injection of microbubbles. Thus, from this point arises a stretch of flotation in this watercourse and subsequent formation of floating sludge (LF), illustrated in FIG. 1.

Therefore, the improved facility, object of the present invention, is provided, after the stretch of floated sludge LF, a dredging set 7, comprising a dredging line or lines 7a, formed by a plurality of interconnected dredging wheels, each dredging alignments 7a extending longitudinally along one bank of the watercourse, in parallel with the axis of the watercourse and along the transverse stretch where there is a corresponding device for scraping the sludge 6, disposed substantially oblique in relation to the watercourse and in relation to a sludge transverse retainer 8 and to a steel cable 6a which supports the scrapers 6 and is extremely connected to winches 7b which compose the dredging set 7 and are designed to move these scrapers 6 toward the banks of the watercourse, so that the latter act as shifters scrapers and thickeners of sludge toward the alignment of the dredging wheels 7a. Although not illustrated, because it is not part of the scope of the improvement, the sludge removed by the alignment of rotative dredgers 7a is conducted to a capture container, which is connected through a suction pipe, which by means of a pump, conducts the removed or dredged sludge from the watercourse for a limited and distant area from the watercourse, where it is temporarily stored for subsequent dehydration and recycling as a byproduct, depending on its composition.

Figure 1:
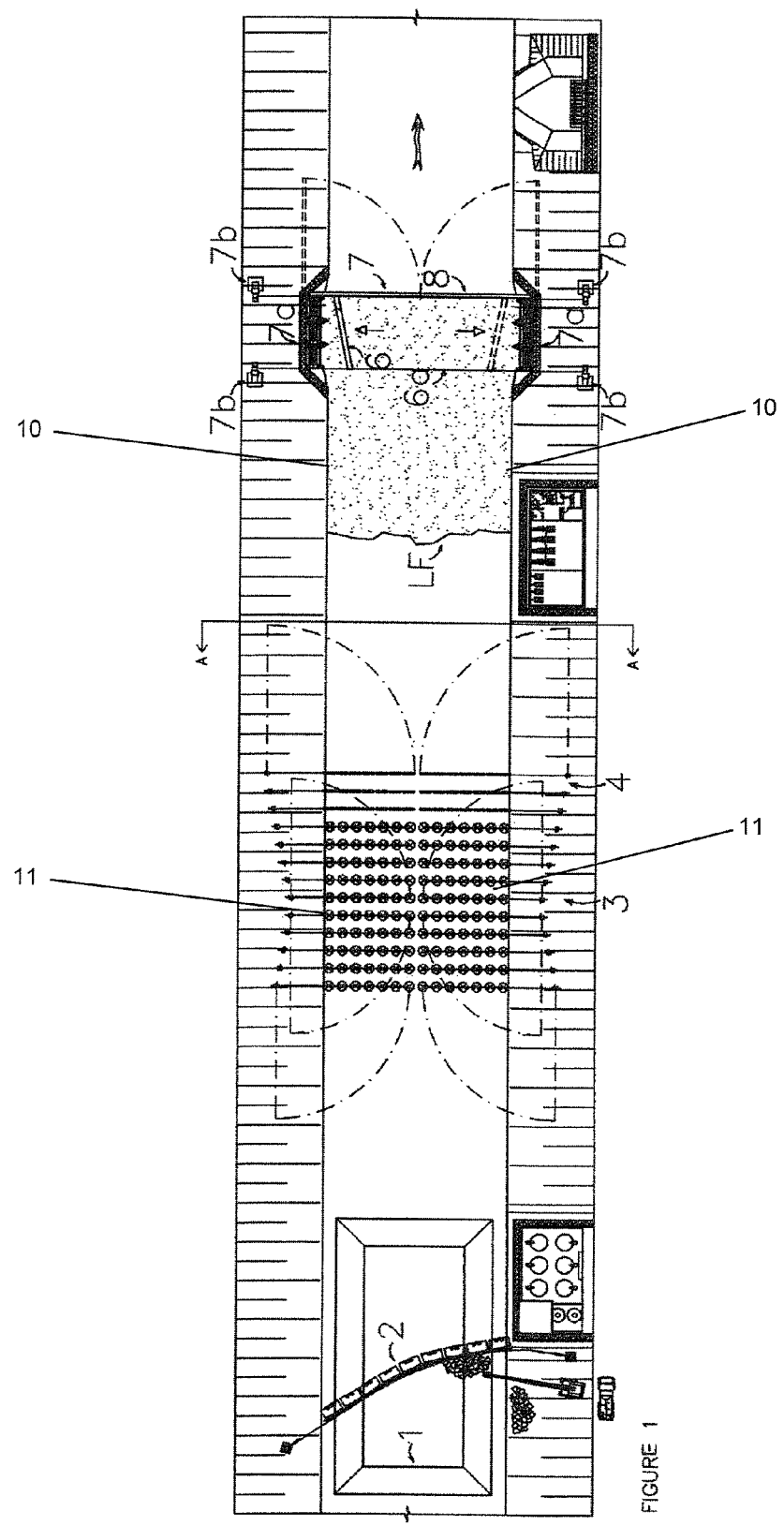
FIG. 1 shows, schematically and partially, a stretch of a watercourse, in which is mounted the facility for removal of polluting substances in suspension present in this watercourse according to this improvement proposed.

As can be seen in FIG. 1, the cross sludge retainer 8 is defined by two arms with their respective ends pivoted and/or rotative at the bank of the watercourse, so they can have an angular displacement in relation to the watercourse bed, clearing the latter when required.

Figure 2:
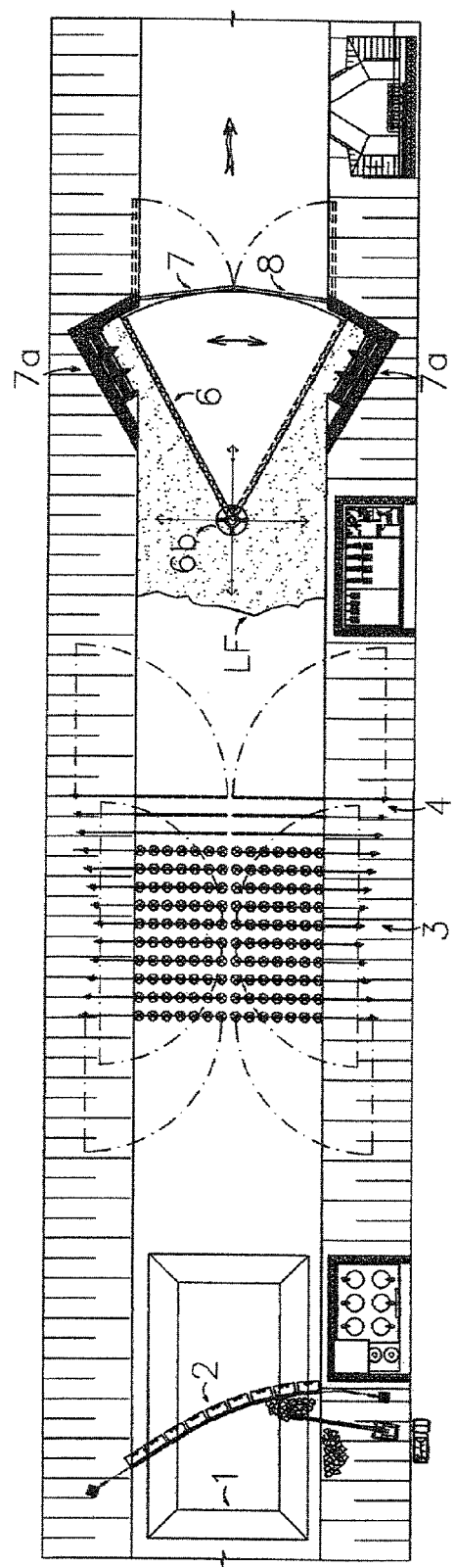
FIG. 2 shows, schematically and partially, a stretch of a watercourse, in which is mounted a second version of the facility for removal of polluting substances in suspension present in this watercourse, according to this improvement proposed.

FIG. 2 illustrates and presents a second version of the improvement, in which the dredging set 7, composed by two alignments for dredging 7a, formed by a plurality of interconnected dredging wheels, and these alignments for dredging 7a are mounted and an oblique retrocession performed with each of the banks of the watercourse, in order to remain parallel to the plan of operation of a sludge scraper 6, pivoted to a vertical structure 6b, mounted in a mid-point of the watercourse's width, to receive the tip of this sludge scraper 6, which will act in angular movement in relation to the watercourse and before the transverse sludge retainer 8, thus this angular movement will alternately move this scraper 6 toward the banks of the watercourse, where the alignments of dredging wheels are placed.

Figure 3:
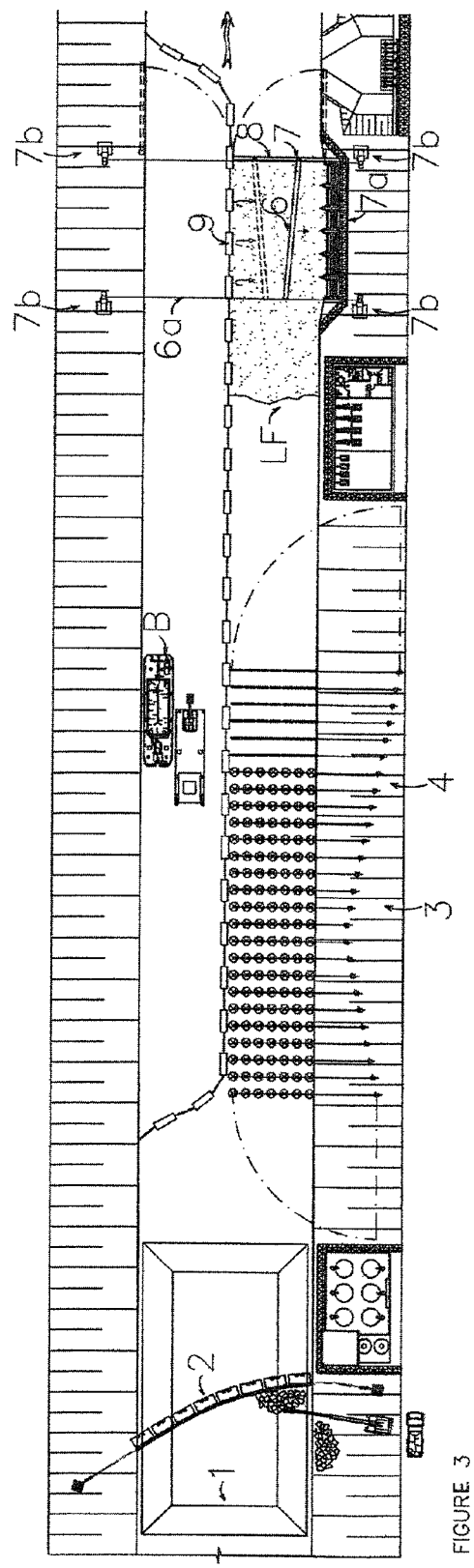
FIG. 3 shows, schematic and partially, a stretch of a watercourse, in which is mounted a third version of the facility for removal of polluting substances in suspension present in this watercourse, according to this improvement proposed.

FIG. 3 illustrates and presents a third version of the improvement, when is provided along the watercourse a floating structure 9 that extends along the entire stretch of the facility, and is likely to traverse displacement from one bank to the median axis of watercourse, allowing that the half of the bed of the watercourse is selectively determined and isolated, for it be cleared of equipment to allow the passage of a vessel B and/or dredging of the watercourse bed, for instance. In this version, the dredging set 7 is composed by a dredging alignment 7a, formed by a plurality of dreding wheels arranged at the bank of the watercourse, opposite to the one where the floating curtain 9 in its inoperating condition is placed, this dredging alignment 7a is maintained longitudinal and along the bank of the watercourse, in parallel with the axis of this watercourse and along the transverse stretch of operation of a sludge scraper 6, disposed substantially oblique in relation to the watercourse and in relation to a sludge transverse retainer 8 and the steel cable 6a which supports the scraper 6, this cable 6a is connected to winches 7b composing the dredging set 7, which are designed to move this scraper 6 between the banks of the watercourse, so that this scraper 6 acts as transport of sludge toward the alignment of dredging wheels 7a.

Despite versions of IMPROVEMENT ON FACILITY for removal of materials and/or polluting substances in watercourses having been described and illustrated, it is noteworthy that changes and adjustments of equipment and components are possible and predictable without disregarding the scope of this invention.

The invention claimed is:
1. A facility for removing materials or polluting substances contained in watercourses, the facility including a watercourse comprising:
   a watercourse bed;
   two banks;
   a first portion, wherein the first portion comprises a sandbox arranged on the watercourse bed, and a floating garbage fence downstream from the sandbox and substantially transverse to the watercourse,
   wherein the first portion is configured to remove large materials from the watercourse;
   a second portion, wherein the second portion comprises a metallic structure transverse to the watercourse and suspended above the watercourse, wherein the metallic structure comprises at least a first, a second, and a third curtain, each curtain being separated from another by at least one homogenization diffuser, wherein the first curtain is configured to inject coagulants into the watercourse, wherein the second curtain is configured to inject polymers into the watercourse, such that an aggregation of particles in suspension forms in the watercourse, and wherein the third curtain is configured to inject air particles into the watercourse, thereby generating microaeration, such that at least a portion of the aggregation of particles float substantially to the surface of the watercourse;

a third portion, wherein the third portion comprises at least one longitudinal, flexible barrier comprising a synthetic membrane, the barrier being configured to concentrate the aggregation of particles, and including a plurality of dredging modules extending along at least a first bank of the two banks, the flexible barrier further comprising a sludge retainer configured to capture and remove the concentrated aggregation of particles; and a pump configured to pump the concentrated aggregation of particles from the watercourse to a separate area for dehydration or recycling as a byproduct, wherein the first, second, and third curtain are configured to be automatically activated, and wherein the metallic structure comprises a plurality of arms configured to pivot or rotate along the banks, such that the metallic structure may by vertically and horizontally displaced, thereby becoming partially or completely removed from the watercourse via angular displacement.

2. The facility according to claim 1, wherein the plurality of arms comprise a plurality of elevated beams, wherein each elevated beam is supported by a vertical column and at least one tension cable, and wherein the at least one tension cable is configured to at least partially angularly displace its corresponding supported elevated beam.

3. The facility according to claim 2, wherein each of the first, second, and third curtain is supported by at least a first, second, and third elevated beam of the plurality of elevated beams, and wherein each of the first, second, and third curtain comprises at least two injection pumps, at least two, release valves, and at least two extendible flexible hoses, wherein the flexible hoses are configured to travel downwardly toward the watercourse bed until one end of the flexible hose reaches the watercourse bed.

4. The facility according to claim 1, wherein each of the plurality of dredging modules comprises a plurality of interconnected wheels, wherein the sludge retainer is substantially transverse to the watercourse, wherein the flexible barrier further comprises at least one sludge scraper disposed substantially oblique to the watercourse and the sludge retainer, and wherein the at least one sludge scraper is supported by at least a first steel cable that is attached at one end to a first winch that is attached to a first of the plurality of dredging modules, wherein the at least a first steel cable is configured to displace the sludge scraper toward the first bank.

5. The facility according to claim 4, further comprising:
a second sludge scraper, wherein the second sludge scraper is supported by at least a second steel cable that is attached at one end to a second winch that is attached to a second of the plurality of dredging modules, wherein the at least a second steel cable is configured to displace the second sludge scraper toward a second of the two banks, wherein the first and second dredging modules are on opposite banks and extend parallel to the watercourse.

6. The facility according to claim 4, wherein the first dredging module is disposed substantially oblique to the first bank, and the facility further comprising a second sludge scraper, wherein the second sludge scraper is supported by at least a second steel cable that is attached at one end to a second winch that is attached to a second of the plurality of dredging modules, wherein the at least second steel cable is configured to displace the second sludge scraper toward a second of the two banks, and wherein the second dredging module is disposed substantially oblique to the second bank, wherein the first scraper and the second scraper are fixed to a pivot structure located in the watercourse about halfway between the first bank and the second bank, such that the first scraper is parallel to the first dredging module and the second scraper is parallel to the second dredging module when the pivot structure is in a first position, and wherein the pivot structure may angularly displace the first and second structure to a second position.

7. The facility according to claim 1, further comprising:
a floating curtain parallel to the a second bank of the two banks, the floating curtain being configured to travel between the second bank and a midline of the watercourse, such that when the floating curtain is located at the midline of the watercourse, half of the watercourse is clear, wherein each of the plurality of dredging modules comprises a plurality of interconnected wheels, wherein the flexible barrier further, comprises at least one sludge scraper disposed substantially oblique to the watercourse and the sludge retainer, and wherein the sludge retainer is substantially transverse to the watercourse, wherein the at least one sludge scraper is supported by at least a first steel cable that is attached at one end to a first winch that is attached to a first of the plurality of dredging modules, wherein the at least first steel cable is configured to displace the sludge scraper toward the first bank.

8. The facility according to claim 1, wherein each of the plurality of dredging modules comprises a plurality of interconnected wheels, and wherein the flexible barrier further comprises at least one sludge scraper disposed substantially oblique to the watercourse and the sludge retainer, wherein the sludge retainer is substantially transverse to the watercourse, wherein the at least one sludge scraper is supported by at least a first steel cable that is attached at one end to a first winch that is attached to a first of the plurality of dredging modules, wherein the at least first steel cable is configured to displace the sludge scraper toward the first bank.

9. A system for removing materials contained in a watercourse, the system comprising:
a sandbox arranged at the bottom and in one stretch of the watercourse, downstream of the sandbox, a floating garbage fence disposed substantially transverse to the watercourse, wherein thick materials coming from the watercourse are removed from the watercourse;

downstream and separated from the garbage fence, a metallic structure suspended above and substantially transverse to the watercourse, the structure including a plurality of mechanical arms suspended transverse to the watercourse and having mounted thereon at least three curtains for selective automatic injection, the curtains being spaced from one another and interspersed with homogenization diffusers, and the structure being enabled thereby to access at least a portion of the bed of the watercourse;

wherein the first curtain provides for injection of coagulants;

wherein the second curtain provides for injection of treatment polymers in the watercourse; wherein coagulation is provided in this watercouse, so that aggregation of particles in suspension occurs, defining larger flakes of flocculation; and wherein the third curtain provides for injection for microaeration, wherein larger aggregated particles in the waterstream are subject to at least one phase for release of microbubbles, causing a flotation of the aggregated particles;

downstream of the watercourse from the third curtain, a plurality of longitudinal and flexible barriers to provide conduction and superficial agglomeration of floating material, the flexible barriers being formed by synthetic membranes;

a plurality of longitudinally aligned dredging modules extending through the banks of the watercourse, the plurality of dredging modules promoting the concentration of the floating material to enable removal to a capture container and subsequent pumping into a restricted area remote from the watercourse; wherein the remotely located floating material is temporarily stored for subsequent dehydration and recycling as a byproduct.

10. The system of claim 9, wherein the plurality of mechanical arms are formed by a plurality of elevated beams, each of the plurality of elevated beams being supported by vertical columns via tensioner cables, wherein the columns and cables maintain and enable directing of the plurality of beams.

11. The system of claim 10, wherein each beam has a curtain for injection mounted thereon, the curtain for injection being formed by a plurality of injection pumps, relief valves, and extensible flexible hoses positioned such that output therefrom reaches the bottom of the watercourse so as to allow each curtain to provide a transverse line of selective injection.

12. The system of claim 9, further comprising:

downstream of the flotation of particles, a dredging subsystem extending substantially along one of the banks of the watercourse, the dredging subsystem having at least one dredging structure, each of the at least one dredging structure including:

a plurality of interconnected wheels;

at least one sludge scraper disposed substantially oblique to the direction of the watercourse;

a transverse sludge retainer;

at least one cable that supports the at least one sludge scraper; and at least one winch configured to interoperate with the at least one sludge scraper and the at least one cable to displace the least one scraper toward one of the banks of the watercourse to direct sludge toward the plurality of interconnected wheels.

* * * * *